United States Patent
Dai et al.

(10) Patent No.: US 11,023,710 B2
(45) Date of Patent: Jun. 1, 2021

(54) SEMI-SUPERVISED HYBRID CLUSTERING/CLASSIFICATION SYSTEM

(71) Applicants: Peng Dai, Markham (CA); Juwei Lu, North York (CA); Bharath Sekar, North York (CA); Wei Li, Markham (CA); Jianpeng Xu, Markham (CA); Ruiwen Li, Markham (CA)

(72) Inventors: Peng Dai, Markham (CA); Juwei Lu, North York (CA); Bharath Sekar, North York (CA); Wei Li, Markham (CA); Jianpeng Xu, Markham (CA); Ruiwen Li, Markham (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 123 days.

(21) Appl. No.: 16/280,760

(22) Filed: Feb. 20, 2019

(65) Prior Publication Data
US 2020/0265218 A1    Aug. 20, 2020

(51) Int. Cl.
*G06K 9/00* (2006.01)
*G06K 9/62* (2006.01)
(Continued)

(52) U.S. Cl.
CPC ......... *G06K 9/00288* (2013.01); *G06F 16/75* (2019.01); *G06K 9/6218* (2013.01);
(Continued)

(58) Field of Classification Search
CPC ............. G06K 9/00288; G06K 9/6267; G06K 9/6218; G06K 9/6257; G06N 20/00; G06F 16/75
(Continued)

(56) References Cited

U.S. PATENT DOCUMENTS 7,533,094 B2 * 5/2009 Zhang .................. G06F 16/3347
9,811,761 B2 * 11/2017 Cheng ................. G06K 9/00718
(Continued)

OTHER PUBLICATIONS

Chris Bieman, Chinese Whispers—an Efficient Graph Clustering Algorithm and its Application to Natural Language Processing Problems 2006.

*Primary Examiner* — Sheela C Chawan

(57) ABSTRACT

System and method for classifying data objects occurring in an unstructured dataset, comprising: extracting feature vectors from the unstructured dataset, each feature vector representing an occurrence of a data object in the unstructured dataset; classifying the feature vectors into feature vector sets that each correspond to a respective object class from a plurality of object classes; for each feature vector set: performing multiple iterations of a clustering operation, each iteration including clustering feature vectors from the feature vector set into clusters of similar feature vectors and identifying outlier feature vectors, wherein for at least one iteration after a first iteration of the clustering operation, outlier feature vectors identified in a previous iteration are excluded from the clustering operation; and outputting a key cluster for the feature vector set from a final iteration of the multiple iterations, the key cluster including a greater number of similar feature vectors than any of the other clusters of the final iteration; and assembling a dataset that includes at least the feature vectors from the key clusters of the feature vector sets.

20 Claims, 9 Drawing Sheets

(51) Int. Cl.
*G06N 20/00* (2019.01)
*G06F 16/75* (2019.01)

(52) U.S. Cl.
CPC ......... *G06K 9/6257* (2013.01); *G06K 9/6267* (2013.01); *G06N 20/00* (2019.01)

(58) Field of Classification Search
USPC ....... 382/118, 181, 224, 225, 228, 301, 190, 382/195, 199, 155, 156, 232, 251, 253, 382/162, 165; 706/15, 16, 18, 22
See application file for complete search history.

(56) References Cited

U.S. PATENT DOCUMENTS

| | | | |
|---|---|---|---|
| 10,303,866 B1* | 5/2019 | Van Os | G06K 9/00281 |
| 2018/0060649 A1* | 3/2018 | Kastaniotis | G06K 9/00295 |
| 2020/0090186 A1* | 3/2020 | Scavotto | G06F 16/2455 |
| 2020/0167566 A1* | 5/2020 | Marder | G06N 7/005 |

* cited by examiner

SEMI-SUPERVISED HYBRID CLUSTERING/CLASSIFICATION SYSTEM

FIELD

The present disclosure is related to semi-supervised training methods and systems for classifying objects represented in unstructured data.

BACKGROUND

The growing proliferation of digital data is driving a requirement for systems and methods that enable efficient and accurate automated classification of objects represented in unstructured data. One form of unstructured data that is widely studied is image data such as video. The automated classification of objects such as faces in video may be performed using machine learning based classification systems that have been trained using a training dataset. Although existing machine learning based classification systems may obtain high classification accuracy in experimental conditions, the performance of such systems under real conditions is still relatively unstable. Existing machine learning based classification systems often only operate satisfactorily when processing objects that are presented in conditions that are very similar to the training dataset, and may get confused when the objects are presented under different conditions. These differing conditions may for example result from changes in the physical condition of the object that is represented in the unstructured data as well as from changes to the condition of the environment of the object.

By way of example, existing machine learning based classification systems may be trained to classify a face based on a single image with a front face presented under ideal lighting conditions. However, in practical applications, the physical conditions of a face image in an actual video may change relative to those of the corresponding face image represented in the training sample. For example, relative to training samples, the face in a particular video may, among other things, be older, have different makeup applied, have different facial hair styling, have more or less coverage provided by head hair, be wearing a hat or other hair covering article, be taken from a different angle (e.g. a side face image), or be partially blocked. Further, the face may be presented in the video under different environmental conditions than the training sample, including for example, blurring, higher lighting, lower lighting, different videography techniques such as coloring and/or filtering, and different backgrounds, among other things. In the present document, these physical and environmental conditions of an object represented in unstructured dataset are referred to as the application domain of the object. The differences in the application domain may adversely impact the performance of an automated classification system.

Accordingly, there is a need for a machine learning based classification system that can be trained to accurately and efficiently classify objects represented in different application domains.

SUMMARY

Methods and systems are described in this disclosure for classifying data objects that occur in unstructured datasets. In at least some examples, feature vectors representing the data objects are automatically labelled using a machine learning based classification system, and similarly labelled feature vectors are clustered based on similarity. In at least some applications, the clusters include higher confidence clusters that take into account the application domain and varied conditions of the unstructured dataset, thereby providing an improved training dataset for training a machine learning based classification system.

According to a first example aspect of the disclosure is a computer implemented method for classifying data objects occurring in an unstructured data. The method includes extracting feature vectors from the unstructured data, each feature vector representing an occurrence of a data object in the unstructured data, and classifying the feature vectors into feature vector sets that each correspond to a respective object class from a plurality of object classes. Furthermore, for each feature vector set, the method includes performing multiple iterations of a clustering operation, each iteration including clustering feature vectors from the feature vector set into clusters of similar feature vectors and identifying outlier feature vectors, wherein for at least one iteration after a first iteration of the clustering operation, outlier feature vectors identified in a previous iteration are excluded from the clustering operation. For each feature vector set, a key cluster is output for the feature vector set from a final iteration of the multiple iterations, the key cluster including a greater number of similar feature vectors than any of the other clusters of the final iteration. The method also includes assembling a dataset that includes at least the feature vectors from the key clusters of the feature vector sets.

In at least some example embodiments of the first aspect, classifying at least some of the feature vectors into feature vector sets is performed by inputting the feature vectors to a learning based classifier module that has been trained to perform the classifying based on training samples for a predetermined set of object classes, the method comprising retraining the classifier module using the assembled dataset.

In at least some examples, the object classes include known object classes and an unknown object class corresponding to feature vectors that are not classified into feature vectors sets corresponding to the known object classes, the method including, following the retraining of the learning based classifier module, providing the feature vectors included in the unknown object class to the learning based classifier module for reclassification.

In at least some examples, the unstructured data includes a video including successive image frames; the data objects each correspond to a respective face image; and the object classes each correspond to a respective individual person.

In at least some examples, extracting feature vectors from the unstructured data comprises identifying a face image over a series of successive image frames as an occurrence of a data object corresponding to the face image, and extracting the feature vector representing the data object based on data included in a plurality of the successive image frames.

In at least some examples embodiments, the method includes displaying items on a display screen representing one or more of the features vectors, and in response to one or more predetermined input actions detected in respect of the displayed items, updating the assembled dataset.

In at least some example embodiments, in addition to outputting the key cluster for each feature vector set, the method further includes: outputting the other clusters from the final iteration of the clustering operation for the feature vector set, and outputting the outlier feature vectors from all iterations of the clustering operation for the feature vector set, the output key clusters, output other clusters and output outlier feature vectors for the feature vector sets being stored in memory. In some examples the method further includes:

displaying items that each represent a respective feature vectors of a selected cluster; in response a user action selecting one of the items, removing the feature vector represented by the selected item from the selected cluster.

In at least some examples, the method includes: displaying object class items representing respective object classes; in response to a user action indicating one of the object class items; reclassifying the feature vector represented by the selected item to the feature vector set corresponding to the object class represented by the indicated object class item; and including the reclassified feature vector in the assembled dataset.

According to a second example aspect is a system for classifying data objects occurring in an unstructured data, the system including: a classification system, a clustering system, and a dataset assembly module. The classification system is configured to: extract feature vectors from the unstructured data, each feature vector representing an occurrence of a data object in the unstructured data; and classify the feature vectors into feature vector sets that each correspond to a respective object class from a plurality of object classes. The clustering system is configured to, for each feature vector set: perform multiple iterations of a clustering operation on the feature vector set, each iteration including clustering feature vectors from the feature vector set into clusters of similar feature vectors and identifying outlier feature vectors, wherein for at least one iteration after a first iteration of the clustering operation, outlier feature vectors identified in a previous iteration are excluded from the clustering operation; and output a key cluster for the feature vector set from a final iteration of the multiple iterations, the key cluster including a greater number of similar feature vectors than any of the other clusters of the final iteration. The dataset assembly module is configured to assemble a dataset that includes at least the feature vectors from the key clusters of the feature vector sets.

In at least some example embodiments of the second aspect, the classification system includes a learning based classifier module that has been trained to perform the classifying based on training samples for a predetermined set of object classes.

In at least some example embodiments, the system is facial recognition system and the unstructured data is a video including successive image frames; the data objects each correspond to a respective face image; and the object classes each correspond to a respective individual person.

In at least some example embodiments, the classification system includes a feature extraction module configured to extract the feature vectors from the unstructured data by identifying a face image over a series of successive image frames as an occurrence of a data object corresponding to the face image, and extracting the feature vector representing the data object based on data included in a plurality of the successive image frames.

In at last some example embodiments, the system includes a human interface system configured to: display items on a display screen representing one or more of the features vectors; and in response to one or more predetermined input actions detected in respect of the displayed items, update the assembled dataset.

In at least some example embodiments, the clustering system is configured to, for each feature vector set, output the other clusters from the final iteration of the clustering operation for the feature vector set in addition to the key cluster, and output the outlier feature vectors from all iterations of the clustering operation for the feature vector set. The system stores in a memory the output key clusters, output other clusters and output outlier feature vectors for the feature vector sets. The further includes a human interface system configured to: display items that each represent a respective feature vectors of a selected cluster; and, in response a user action selecting one of the items, remove the feature vector represented by the selected item from the selected cluster.

In at least some examples, the human interface system is configured to: display object class items representing respective object classes; in response to a user action indicating one of the object class items; reclassify the feature vector represented by the selected item to the feature vector set corresponding to the object class represented by the indicated object class item; and include the reclassified feature vector in the assembled dataset.

According to a third example aspect of the disclosure is a computer implemented method comprising: performing multiple iterations of a clustering operation to classify feature vectors that each represent a respective data object in an unstructured dataset, each iteration of the clustering operation including classifying groups of similar feature vectors into respective clusters and classifying feature vectors not included in one of the respective clusters as outlier feature vectors, wherein during one or more of the multiple iterations after a first iteration, outlier feature vectors from a previous iteration are excluded from the clustering operation.

In at least some example embodiments of the third aspect, for each iteration of the clustering operation after the first iteration, the feature vectors that are classified: (i) include the groups of feature vectors included in the clusters generated in the previous iteration of the clustering operation; and (ii) exclude any feature vectors classified as outlier feature vectors in the previous iteration.

For at least some examples of the method of the third aspect, for each iteration of the clustering operation, the clusters of similar feature vectors are generated using a similarity graph clustering function, the clusters including a key cluster that includes a threshold ratio of the feature vectors that are being classified during the iteration.

For at least some examples, the similarity graph clustering function is configured to cluster feature vectors based on a set similarity threshold, and for each iteration of the clustering operation, the similarity graph clustering function is repeated one or more times using a different set similarity threshold each time if the key cluster does not include the threshold ratio of the feature vectors.

For at least some examples, the similarity graph clustering function is implemented using a Chinese Whispers algorithm wherein the feature vectors being classified are represented as nodes and similarity between the feature vectors is represented by weighted edges connecting the nodes.

According to a fourth example aspect is a system including a processing device, and a non-transitory memory coupled to the processing device storing computer readable instructions that, when executed, configure the processing device to: perform multiple iterations of a clustering operation to classify feature vectors that each represent a respective data object in an unstructured dataset, each iteration of the clustering operation including classifying groups of similar feature vectors into respective clusters and classifying feature vectors not included in one of the respective clusters as outlier feature vectors, wherein during one or more of the multiple iterations after a first iteration, outlier feature vectors from a previous iteration are excluded from the clustering operation.

According to example embodiments of the fourth example aspect, for each iteration of the clustering operation after the first iteration, the feature vectors that are classified: (i) include the groups of feature vectors included in the clusters generated in the previous iteration of the clustering operation; and (ii) exclude any feature vectors classified as outlier feature vectors in the previous iteration.

According to example embodiments of the fourth example aspect, the computer readable instructions configure the processing device to implement a similarity graph clustering function, wherein for each iteration of the clustering operation, the clusters of similar feature vectors are generated using the similarity graph clustering function, the clusters including a key cluster that includes a threshold ratio of the feature vectors that are being classified during the iteration.

According to some example embodiments of the fourth example aspect the similarity graph clustering function is configured to cluster feature vectors based on a set similarity threshold, and for each iteration of the clustering operation, the similarity graph clustering function is repeated one or more times using a different set similarity threshold each time if the key cluster does not include the threshold ratio of the feature vectors.

According to example embodiments of the fourth example aspect, the similarity graph clustering function is implemented using a Chinese Whispers algorithm wherein the feature vectors being classified are represented as nodes and similarity between the feature vectors is represented by weighted edges connecting the nodes.

BRIEF DESCRIPTION OF THE DRAWINGS

Reference will now be made, by way of example, to the accompanying drawings which show example embodiments of the present application, and in which.

Similar reference numerals may have been used in different figures to denote similar components.

DESCRIPTION OF EXAMPLE EMBODIMENTS

Example embodiments of a semi-supervised learning based classification system for classifying data objects represented in unstructured data and methods for training such a system and generating training datasets will now be described. In example embodiments, clustering is applied to identify high confidence classification results and isolate low confidence classification results. The clustering results are then used to adapt the system to the specific conditions under which the data objects are represented in the unstructured data. The specific conditions under which data objects are represented in a set of unstructured data is known as the specific application domain. Accordingly, in example embodiments, clustering is applied to extract domain knowledge, which can then be used to create a training dataset for training a classification system to adapt to the specific application domain.

Figure 1:
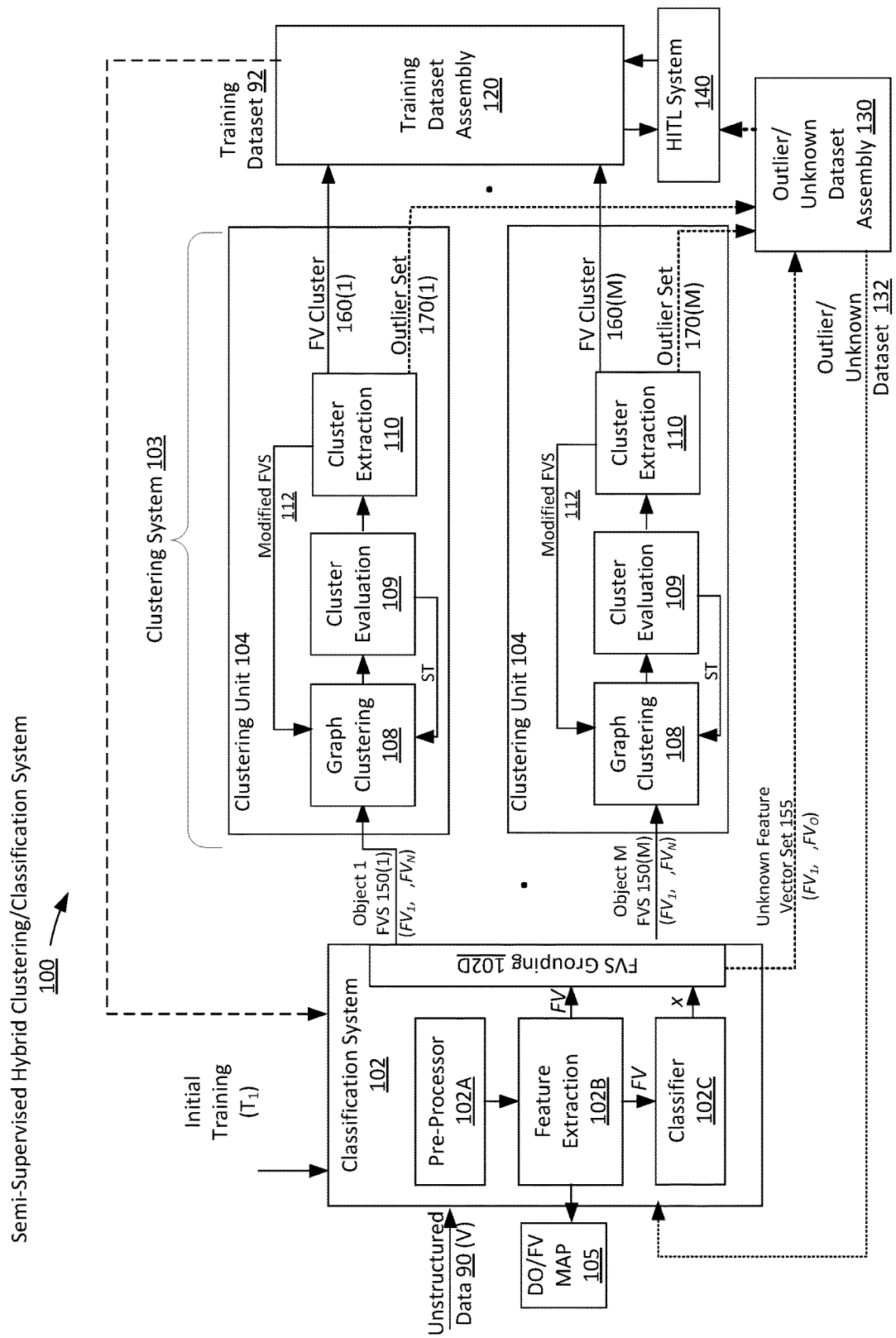
FIG. 1 is a schematic diagram illustrating an example of a semi-supervised hybrid clustering/classification system according to example embodiments.

A description of a system that applies clustering will now be described. In this regard, FIG. 1 is a schematic diagram of a semi-supervised hybrid clustering/classification system 100 (hereinafter "system" 100) according to example embodiments. In at least some embodiments, system 100 is implemented using one or more processing systems (an example processing system 200 is described in greater below) configured by software to perform the operations and functions that are described below.

In the example embodiment of FIG. 1, the system 100 includes a plurality of sub-systems and modules, including a learning based classification system 102 (hereinafter "classification system" 102), a clustering system 103 and a training dataset assembly module 120. The input to system 100 is unstructured data 90 that includes data objects, representing objects of interest (for example target objects), along with background data, and the output of system 100 is a training dataset 92 that includes labelled data objects or labelled feature vectors (FVs). At least some of the data objects included in the unstructured data 90 can be classified by object class. As known in the art, examples of unstructured data include, but are not limited to: videos, photos, graphic images, emails, audio files, web pages, and social media messages. Although the system 100 can be applied to different types of unstructured data, an illustrative embodiment will be presently described in the context of object recognition in image data, and more particularly in the context of facial recognition in videos.

Thus, in an illustrative embodiment, the unstructured data 90 includes one or more videos (V) such as movies, films, documentaries, news clips, social media clips, surveillance video etc. Each video is made up of a series of successive frames. Each frame represents a respective image as a two dimensional array of picture elements (pixels) that are each assigned a color value. Each video includes images of a number of different people (for example actors in the event of a film video), many of whom will appear at different times during the video. In example embodiments, each person appearing in the video represents a respective data object class that can be identified by a unique label. The face images of these people are data objects that can each be classified and assigned a label according to the identity of the person shown in the face image. Multiple data objects corresponding to a specific known object class (e.g. the same person) may have discrete occurrences throughout the video.

In example embodiments the classification system 102 is configured to output a respective set of feature vectors ($FV_1, \ldots, FV_N$) for each known object class (Object 1 to Object M) represented in the unstructured data 90. Each feature vector FV is a multidimensional numeric representation of a specific detected occurrence of a data object. In the illustrated example, the number of initial object classes is M (e.g. the classification system 102 is configured to identify face images corresponding to M different people). The number, N, of feature vectors ($FV_1, \ldots, FV_N$) classified into each object class may, and typically will be, different for each object class as the number of data objects corresponding to each object class will typically have a different number of occurrences in the unstructured data 90. For example, the number of appearances of one person throughout a video will be different than for another person.

In example embodiments, classification system 102 includes one or more machine-learning functions, which may for example be implemented using one or more trainable neural networks. In the example of FIG. 1, classification system 102 includes a feature extraction module 102B, a classifier module 102B, and a feature vector set (FVS) grouping module 102D. In some embodiments, modules 102B and 102C are implemented by different neural networks, for example different convolution neural networks, and in some examples modules 102B and 102C are implemented as a single deep neural network, for example a deep convolution neural network. In some examples, classification system 102 may also include a pre-processor module 102A that processes the data objects of the unstructured data 90 before the data object is provided to feature extraction module 102A. The pre-processing module may for example perform filtering or conversion operations to the data objects in the unstructured data 90. In some examples, pre-processor module 102A may also include one or more machine-learning functions, and in various embodiments some or all of the operations of pre-processor module 102A could be integrated into feature extraction module 102A. In some examples, some or all of the operations of modules 102A, 102C and 102A could be implemented using a single deep neural network.

Feature extraction module 102B is configured to extract a respective feature vector FV representation for each detected occurrence of a possible data object. For example, in the case of faces, feature extraction module 102B is configured to detect possible face images occurring in the video and generate, for each detected face image, a respective feature vector FV. Each feature vector FV is provided to classifier module 102C, which is configured to output the object class 1 to M that the feature vector FV has the highest probability of belonging to. In this regard, the classifier module 102C generates an object class label $x \in 1 \ldots M$ for each feature vector FV, each of which represents a respective data object. FVS grouping module 102D is configured to group all of the feature vectors FVs generated by feature extraction module 102B into feature vector sets FVS(1) to FVS(M) based on the object class labels assigned by classifier module 102C. Accordingly, the classification system 102 is configured to assign a class label x to each detected data object based on the feature vector FV representation of that data object and classify the extracted feature vectors FV into sets (Object 1 feature vector set (FVS) 150(1) to Object M FVS 150(M), referred to generically as FVS 150), with each feature vector set corresponding to a respective object class (e.g. a specific person).

In example embodiments, one or more of the feature extraction module 102B, classifier module 102C and pre-processor module 102A are implemented using machine learning based functions trained using an initial labelled training dataset ($T_1$). For example, initial training dataset ($T_1$) may include training samples comprising labelled front face images of different people. The different people in the images correspond to the M known object classes that will be appearing in the video. In example embodiments, the number of training samples in the initial training dataset $T_1$ is quite small and may only include a few labelled front face images for each of the object classes. However, the training samples may be high quality in that each of the labels that identify the person appearing in the image has been verified or assigned through human intervention.

Feature extraction module 102B can be implemented using any number of known techniques for detecting data objects in video and generating feature vector representations for the data objects. In some examples, feature vectors may be generated on a frame by frame basis with each appearance of a data object in a frame being treated as a distinct occurrence having a distinct feature vector. However, in some example embodiments, the appearance of a data object across neighboring frames may be tracked and processed as a single occurrence of the data object and represented by a single feature vector FV. In such examples, the feature vector FV may capture temporal information for the data object that it represents.

By way of example, in some embodiments, preprocessing may be performed by pre-processor module 102A to divide the unstructured data 90 (e.g., video data) into a series of segments based on similarities between neighboring frames. Each segment will correspond to a set of frames that depict a scene having a threshold similarity maintained throughout the segment. Typically, the same face image(s) will appear throughout at least a portion of a segment with only subtle changes between neighboring frames. Feature extraction module 102B is configured to: (i) detect the face images occurring in each segment and track each detected face image across the frames of a segment to create multi-frame image data (e.g. a face track) for each detected face image; and (ii) create a feature vector FV for the multi-frame image data for each detected face image. Accordingly, in some example embodiments, each feature vector FV may represent a respective face track that includes plurality of face images in a series of successive frames. In other example embodiments it is possible that each feature vector FV may be represent a face image from a single frame.

In example embodiments, the system 100 maintains a data object/feature vector mapping (DO/FV MAP) table 105 that includes information mapping each feature vector FV back to the actual data object occurrence in the unstructured data 90 that the feature vector FV represents.

Classifier module 102C is configured to generate a class label for each of the feature vectors FV. The class label identifies an object class of the data object that the feature vector FV represents. The features vectors FV corresponding to each object class are grouped by FVS grouping module 102D in a respective FVS 150 (e.g. a respective feature vector set is generated for each one of the M people, in the case of a facial recognition implementation). In at least some examples, feature vectors FV may be generated for data objects that cannot be identified by classifier module 102C as representing any of the M known object classes. In example embodiments these unclassifiable feature vectors FV are labeled or classed as by FVS Grouping module 102D as unknown and put into an unknown feature vector set (Unknown FVS) 155. By way of example, in the case of facial images, the unknown feature vectors FV may represent face images of people that were not included in the training dataset and thus not part of the M object classes, or may relate to face images of people that were included but which cannot be classed, within an threshold probability, as falling within one of the M object classes by the classifier module 102B.

In example embodiments, because classification system 102 is initially trained only with the small number of training samples included in initial training dataset $T_1$, the application domain represented in training samples may be very limited and different than that represented in parts or all of the unstructured data 90. Because of the limited number of training samples, the accuracy of the classification system 102 may be low, particularly in the case of face images that appear in different application domain conditions than those in the initial training dataset $T_1$. The accuracy of the classification applied to the feature vectors FV of the respective feature vector sets (e.g. Object 1 FVS 150(1) to Object M FVS 150(M)) output by classification system 102 will typically vary within any given set, along with the application domain of the data objects represented by the feature vectors.

Clustering system 103 is configured to group or cluster the feature vectors FV within each object class based on the similarity between the feature vectors FV. The number of similar feature vectors FV within the resulting clusters are then used as an indication of confidence that the respective clusters includes feature vectors FV that represent data objects occurring in a common or similar application domain and, in at least some examples, a confidence that the feature vectors FV have been properly labelled by classification system 102. In example embodiments, the higher confidence feature vectors FV and their associated labels can then be used to generate a new training dataset 92. A possible architecture and operation of the clustering system 103 will now be described according to example embodiments.

In example embodiments, each of FVS 150(1) to 150(M) are processed separately from each other by clustering system 103, and in this regard, clustering system 103 implements M respective object class specific clustering units 104. The architecture and operation of an example embodiment of a clustering unit 104 will now be described in the context of FVS 150(1). As will be noted from the above description, FVS 150(1) includes a plurality of feature vectors $(FV_1, \ldots, FV_N)$ that each represent an occurrence of a data object (e.g. face image) that has been labelled as belonging to a specific object class (e.g. Object 1). In example embodiments, confidence that a group of feature vectors represent a similar application domain and labeling has been correctly applied is based on the premise that confidence is high if the same label is applied to a large number of similar feature vectors. In this regard, as shown in FIG. 1, clustering unit 104 includes a clustering module 108 for grouping together feature vectors FV from FVS 150(1) based on their similarity to each other. As will be described in greater detail below, in example embodiments, clustering unit 104 performs multiple iterations of a clustering operation on the feature vectors FV included in FVS 150(1) to generate an FV cluster group 160(1) that includes a plurality of clusters of similar feature vectors, as well as an outlier FV set 170(1) of dissimilar feature vectors. The FV cluster group 160(1) includes a high confidence key cluster for incorporation into training dataset 92.

In at least some example embodiments, clustering module 108 may be implemented using one or more machine-learning functions, which may for example be implemented using one or more trainable neural networks. Although different types of clustering methods can be applied, in some examples, clustering module 108 is implemented using a machine learning graph clustering function. Graph clustering functions represent objects that are to be clustered as respective nodes of a similarity graph and relationships between the objects are represented as weighted edges that connect the nodes. In this regard, in an example embodiment, a Chinese Whispers clustering algorithm is used to implement the machine learning graph clustering function of clustering module 108, with the feature vectors $(FV_1, \ldots, FV_N)$ being represented as respective nodes in a similarity graph. The weighted edges connecting the nodes are based on a similarity distance function $d(FV_i, FV_j)$, where $FV_i$ and $FV_j$ are respective feature vectors at two nodes of the graph. Depending on the application, different calculations can be used for similarity distance function $d(FV_i, FV_j)$. In an example embodiment, the similarity distance function generates a similarity distance value that corresponds to the Euclidian distance between two nodes. Other possible distance measurements include, for example, Manhattan distance; Minkowski distance; Cosine Similarity; and Jaccard similarity.

During operation, clustering module 108 will determine clusters based on a specified similarity threshold (ST). For example, the similarity threshold (ST) may set a minimum weight threshold for establishing a connecting edge between nodes. An example of the operation of clustering unit 104 is illustrated in the flow chart of FIG. 2. The Object 1 FVS 150(1), which includes N feature vectors $(FV_1, \ldots, FV_N)$, is provided to clustering module 108. Clustering module 108 is configured to generate a cluster module output 223 by classifying the N feature vectors $(FV_1, \ldots, FV_N)$ into clusters of similar feature vectors based on a specified similarity threshold ST (Block 222). Particularly, in the illustrated embodiment, clustering module 108 applies a Chinese Whispers clustering algorithm to identify groups of similar feature vectors within the N feature vectors $(FV_1, \ldots, FV_N)$ and classify the respective groups into respective clusters 250, 252(1) to 252(J). Any feature vectors from FVS 150(1) that are not sufficiently similar to any other feature vectors to be classified into one of the clusters 250, 252(1) to 252(J) are classified as outlier feature vectors FVs 255. Accordingly, the cluster module output 223 includes clusters 250, 252(1) to 252(J) and any outlier feature vectors FV 155. The cluster that includes the largest number of similar feature vectors FV is identified as the key cluster 250 and the remaining clusters are ancillary clusters 252(1) to 252(J).

In example embodiments, clustering unit 104 includes a cluster evaluation module 109 that is configured to evaluate the cluster module output 223 generated by clustering module 108 to determine if the cluster module output 223 meets specified criteria. In the illustrated embodiment, the specified criteria is whether key cluster 250 is sufficiently large (block 224). In one example embodiment, the sufficiently large size threshold is defined as meaning that the key cluster 250 includes at least a predetermined ratio of the feature vectors FV that were input to the clustering module 108. In one example, the predetermined ratio is 50% (e.g. key cluster 250 includes at least N/2 feature vectors in the case of a first clustering iteration performed by clustering unit 104). In the event that the key cluster 250 is not large enough, then the cluster evaluation module 109 sets a revised, broader similarity threshold ST (Block 226), and instructs the clustering module 108 to repeat the clustering task (Block 222). The clustering, evaluation, and similarity threshold revision actions (Blocks 222, 224, 226) are repeated until the key cluster 250 is determined to be large enough (Block 224). In example embodiments, the similarity threshold ST is changed (Block 226) by predetermined amounts with each cycle. By way of example, the similarity threshold ST may have a value between 0 and 1, with 0 corresponding to identical (i.e. no distance) and 1 corresponding to being very different (i.e. maximum distance), with ST=0.3 used for the original clustering cycle, ST=0.5 for a second clustering cycle and ST=0.7 used for a third clustering cycle. In example embodiments, the similarity threshold ST initial value and increments are selected so that the size threshold of block 224 will typically be reached within a known number of cycles, for example three.

Once the clustering module 108 generates a cluster module output 223 that meets the size threshold of block 224, the cluster module output 223 is passed to cluster extraction module 110 which is configured to extract any outlier feature vectors FV 255 from the cluster module output 223 and add them to an outlier feature vector (FV) set 170(1).

Figure 2:
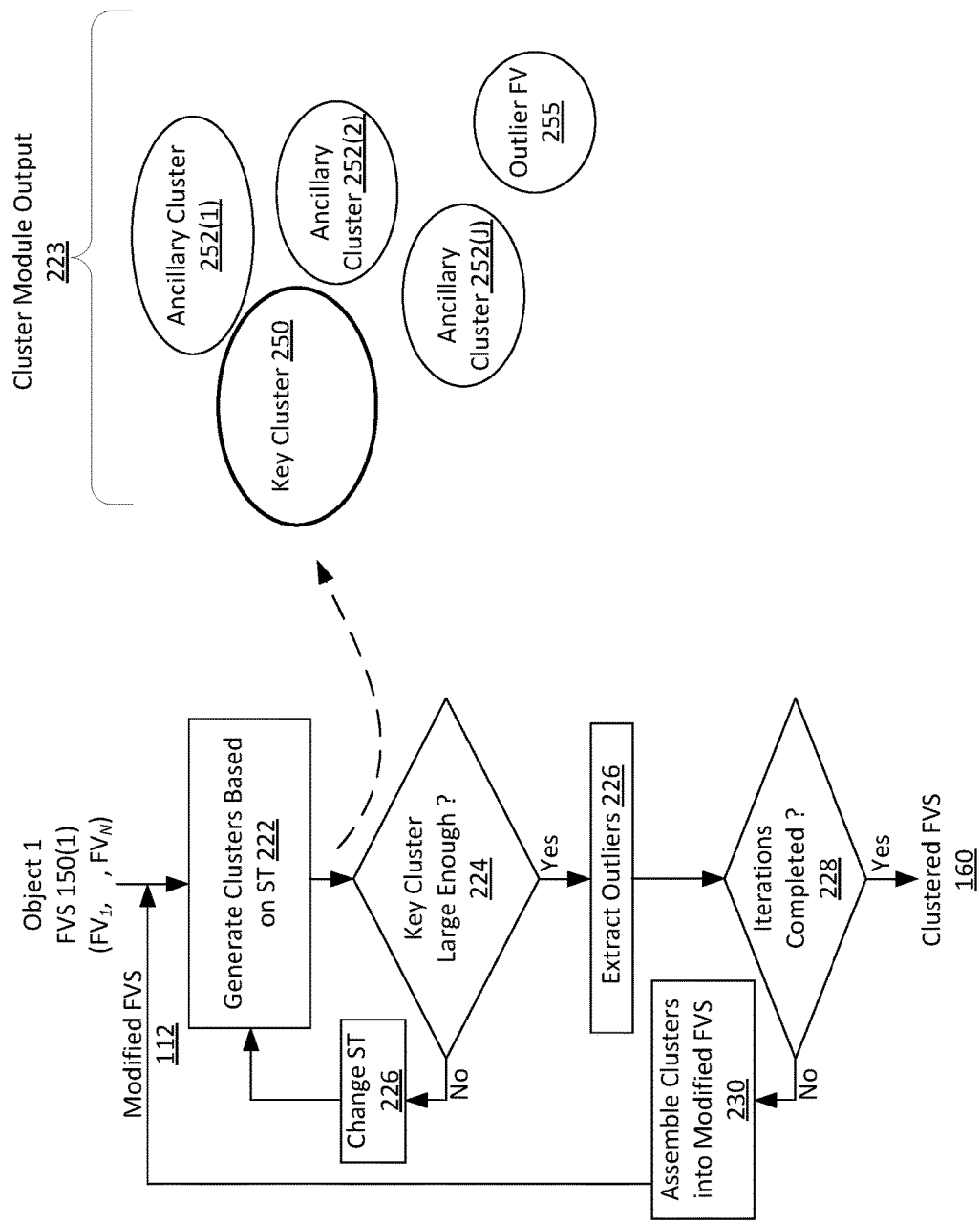
FIG. 2 is flow diagram illustrating a method of clustering feature vectors implemented by the system of FIG. 1, according to an example embodiment.

In example embodiments, the clustering unit 104 is configured to repeat the above actions a predetermined number of iterations, replacing the original feature vector set FVS 150(1) with a modified feature vector set (FVS) 112 that does not include any of the outlier feature vectors FVs 255 identified in previous iterations. In this regard, as indicated in FIG. 2, the cluster extraction module 110 is configured to determine if the predetermined number of iterations has been reached (Block 228), and if not, the key cluster 250 and ancillary clusters 252(1) to 252(J) of cluster module output 223 are combined to form a modified FVS 112 that does not include the outlier feature vectors 255 (Block 230). The modified FVS 112 is then provided to the clustering module 108 and the above process repeated.

Figure 3:
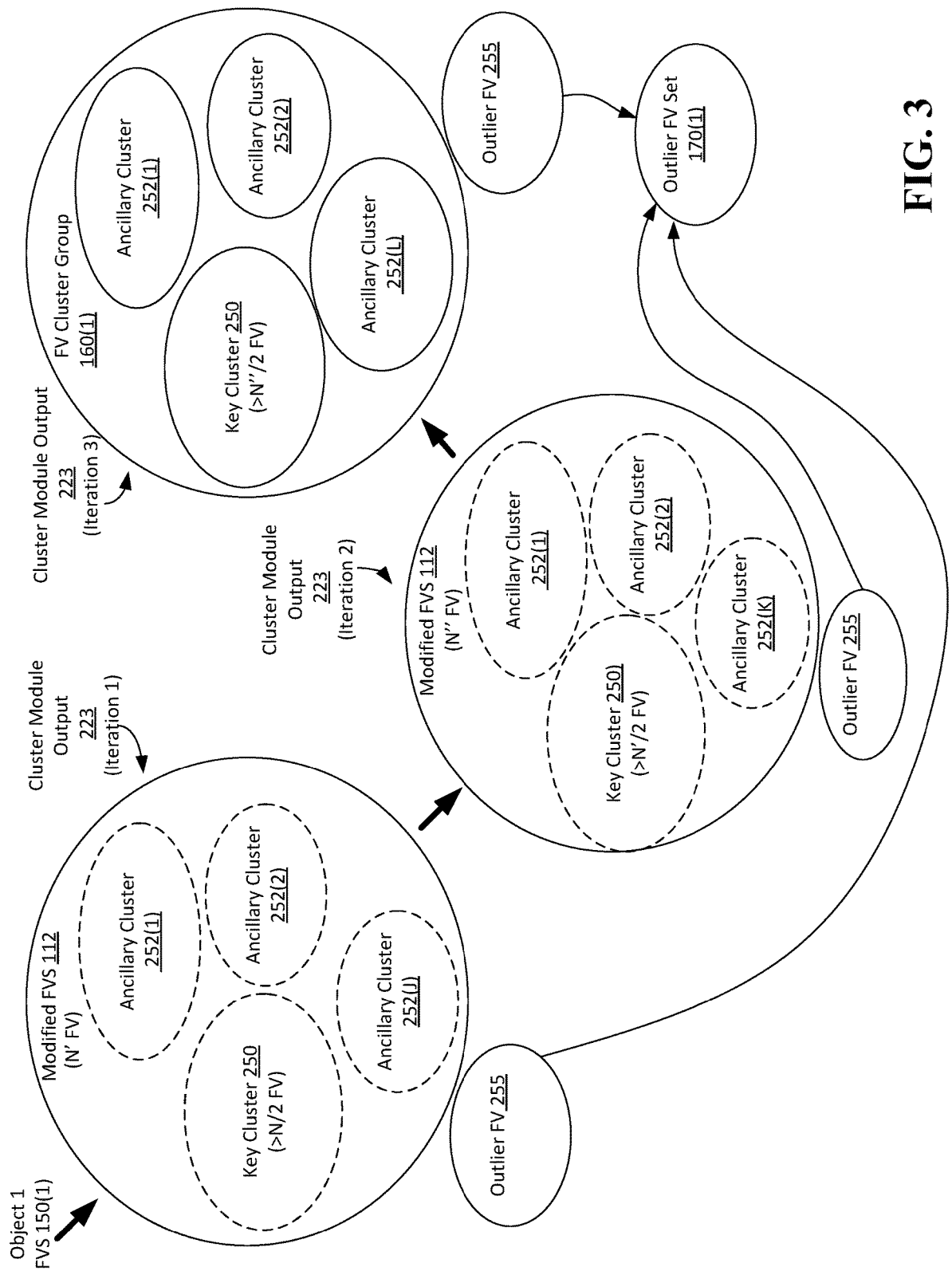
FIG. 3 illustrates the generation of clusters of feature vector sets using the method of FIG. 2.

In an illustrative example embodiment, the number of clustering iterations is three, and in this regard FIG. 3 is a diagram showing initial, intermediate and final cluster module outputs 223 generated by the operation of clustering unit 104 in accordance with the process shown in FIG. 2. As shown in FIG. 3, the cluster module output 223 generated by the first iteration (iteration 1) is the result of clustering performed by clustering module 108 on the N members of input FVS 150(1). The resulting cluster module output 223 (Iteration 1) includes a key cluster 250 of a threshold amount (e.g. >N/2) of feature vectors FVs, a number of ancillary clusters 252(1) to 252(J), and a set of one or more outlier FVs 255. Cluster extraction module 110 is configured to strip out the outlier FVs 255 and add them to an outlier FV set 170(1) and consolidate the feature vectors FV included in the key cluster 250 and ancillary clusters 252(1) to 252(J) into modified FVS 112 that includes N' feature vectors (where N'<N).

The N' feature vectors included in modified FVS 112 from iteration 1 are then clustered by clustering module 108 to generate cluster module output 223 (Iteration 2), which includes a key cluster 250 of a threshold amount (e.g. >N'/2) of feature vectors FVs, a number of ancillary clusters 252(1) to 252(K), and a set of one or more outlier FVs 255. Cluster extraction module 110 is configured to strip out the outlier FVs 255 and add them to outlier FV set 170(1) and consolidate the feature vectors FV included in the key cluster 250 and ancillary clusters 252(1) to 252(J) into a new modified FVS 112 that includes N" feature vectors (where N"<N').

Finally, the modified FVS 112 from iteration 2 is then clustered by clustering module 108 to generate cluster module output 223 (Iteration 3), which includes a key cluster 250 of a threshold amount (e.g. >N"/2) of feature vectors FVs, a number of ancillary clusters 252(1) to 252(L), and a set of one or more outlier FVs 255. Cluster extraction module 110 is configured to strip out the outlier FVs 255 and add them to outlier FV set 170(1). In the final iteration, the resulting key cluster 250 and ancillary clusters 252(1) to 252(L) are not combined into a common feature vector set, but rather are output by the clustering unit 104 as discrete member clusters of FV cluster group 160(1). The number of feature vectors FV included in each cluster within FV cluster group 160(1) is indicative of the confidence of the classification applied to the feature vectors FV within the cluster by classifier module 102B, with key cluster 250 representing the highest degree of confidence of the clusters within the FV cluster group 160(1). In some cases examples, the numbers J, K and L of ancillary clusters generated in at least two iterations (and possibly three) may be the same, and in some cases the numbers could be different.

In at least some scenarios, the removal of the outlier feature vectors FV 255 during each clustering operation iteration results in less relevant application domain information being removed from the data set being fed back to the clustering module 108 for the next iteration, providing self-supervision that may, for at least some datasets, improve the accuracy of the clustering operation performed by clustering module 108. In example embodiments, some of the functions or actions described above as being performed by the various modules 108, 109 and 110 of the clustering unit 104 may be combined within one or more modules or divided out among a greater number of modules. Although in the examples described above, the outlier feature vectors FV 255 are feature vectors that are not included a cluster with any other feature vectors, in at least some examples, the feature vectors that are part of ancillary clusters 252 that fall below a minimum size threshold may also be classed as outlier feature vectors FV 255 that are stripped out of the modified FVS 112.

In example embodiments, all of the FV cluster groups 160(1) to 160(M) and the outlier FV sets 170(1) to 170(M) output by clustering system 103 are stored in memory by the system 100. As shown in FIG. 1, system 100 includes a training dataset assembly module 120 that receives all of the FV cluster groups 160(1) to 160(M) output by clustering system 103. In one example embodiment, the training dataset assembly module 120 combines all of the key clusters 250 from the FV cluster groups 160(1) to 160(M) into a training dataset 92. In such embodiments the training dataset 92 includes the feature vectors FV from each key cluster 250 for each of the M object classes, and each feature vector FV is labelled according the object class of the data object that it represents. Accordingly, in the case of facial recognition, the training dataset 92 will be populated with several labelled feature vector FV representations of face images for each of the M individuals from the original input video V (unstructured data 90). In example embodiments, the number of labelled feature vectors FV per individual may greatly exceed the number of training samples included in the initial training set ($T_1$). As a result of the cluster classification performed by the clustering system 103, the labelled feature vectors FV included in training dataset 92 have been vetted to include those identified with a higher confidence of being correctly labelled.

Furthermore, inherent in the key clusters 250 included in training dataset 92 is information about the specific application domain of the data objects included in input video V. For example, if any of the M individuals represented in the training dataset 92 have changed their respective appearances relative to the face image samples included in initial training dataset $T_1$ (for example, through aging, different makeup, different hairstyle, weight gain or loss, facial hair change) then the changes will represented in the training dataset 92. Also, changes in the shooting conditions and environment between the samples of initial training dataset $T_1$ and the input video V will also be represented in the training dataset 92.

In at least some examples embodiments, the training dataset assembly module 120 is configured to include in the training dataset 92, in addition to or in the place of labelled feature vectors FV, a labeled version of the underlying data object that the feature vector FV was originally extracted from. This can be done for example by referencing the previously discussed DO/FV MAP table 105 that maps each of the feature vectors FV to the respective data objects that they represent. In this regard, in example embodiments, system 100 is configured to provide training dataset assembly module 120 with the underlying data objects extracted by feature extraction module 102B that correspond to the feature vectors FV of the key clusters 250.

In example embodiments, the training dataset 92 can be provided to retrain classification system 102, and more particularly used to retrain one or more of the machine learning based modules of the classification system 102. By way of example, the high confidence feature vectors FV and their corresponding labels included in the training dataset 92 can be used to retrain classifier module 102B. This retraining may, for example, make the classifier module 102C more accurate in the context if the application domain(s) presented in Video (V). Furthermore, in embodiments in which the training dataset 92 includes (or the system has access to) the underlying data objects that correspond to the labeled feature vectors FV, feature extraction module 102B can be retrained based on the training dataset 92. In some embodiment in which the training dataset 92 includes (or the system has access to) the underlying data objects that correspond to the labeled feature vectors FV and the feature extraction module 102B and the classifier module 102C are implemented using a single end-to-end deep neural network that performs feature extraction and classification, the deep neural network can be retrained based on the training dataset 92.

In some examples, some or all of the ancillary clusters 252(i) included in each of the FV cluster groups 160(1) to 160(M) may also be included in the training dataset 92 in addition to the key clusters 250. For example, ancillary clusters 252(i) that meet a predetermined size threshold may be included in the training dataset 92.

In some examples, system 100 includes an outlier/unknown dataset assembly module 130 that is configured to receive the outlier FV sets 170(1) to 170(M) generated by the clustering system 103, as well as the Unknown FVS 155 generated by classification system 102, to form an outlier/unknown dataset 132 of feature vectors FV. In some examples, the underlying data objects that were used to generate the outlier/unknown feature vectors may be included in the outlier/unknown dataset 132. In example embodiments, the outlier/unknown dataset 132 can be fed back to classification system 102, after it has been retrained using training dataset 92, for reclassification.

Accordingly, in at least some examples, processing systems that are enabled to implement the system 100 may provide quality data sets for semi-supervised training of classification systems, thereby providing increased efficiency and accuracy, particularly for applications where target objects may appear in varying conditions in unstructured data.

In at least some examples, training dataset 92 is stored and used to train other classification systems that are similar to classification system 102.

In at least some example embodiments, the system 100 is also configured to enable human intervention to further improve the quality of training samples in the training dataset 92. In this regard, as shown in FIG. 1, in example embodiments the system 100 includes a Human-In-The-Loop (HITL) system 140. HITL system 140 is a human interface system enabled by software running on a processing system and is configured to provide a user interface that allows a human user to interact with other components of system 100 to perform one or more of the following operations: (i) confirm that the correct labels and cluster classifications have been applied to feature vectors FVs; (ii) correct incorrect labels and cluster classifications; and (iii) label unknown feature vectors and create new object classes. In example embodiments, HITL system 140 has access to stored data that includes the FV cluster groups 160(1) to 160(M), the outlier FV sets 170(1) to 170(M) and the Unknown FVS 155, and is enabled to communicate with at least some of the modules of system 100. Furthermore, in an example embodiments, HITL system 140 also has access to the underlying face image data that is represented by each of the feature vectors FV included in the FV cluster groups 160(1) to 160(M), the outlier FV sets 170(1) to 170(M). As indicated above, the underlying face image data may for example be obtained by reference to DO/FV MAP table 105.

In example embodiments, HITL system 140 is configured to display information on a display screen, receive user input through one or more user input interfaces in respect of the displayed information, and then cause updates to the training samples in the training dataset 92 based on the user inputs.

An example of the operation of HITL system 140 will be described with reference to FIGS. 4 to 9, of which FIGS. 4, 5, 6 and 9 illustrate representations of a graphical user interface (GUI) 400 that may be displayed on the display screen of a computer processing system. In the illustrated example of a facial recognition system, the face images being processed correspond to actors, and the system 100 is being used to label all occurrences of actors in input movie video V in order to create metadata for the movie. Images of the actor's faces through the video V are represented by the labelled feature vectors FV in each of the FV cluster groups 160(1) to 160(M). The label for each feature vector identifies the actor whose face is represented by the feature vector.

Figure 4:
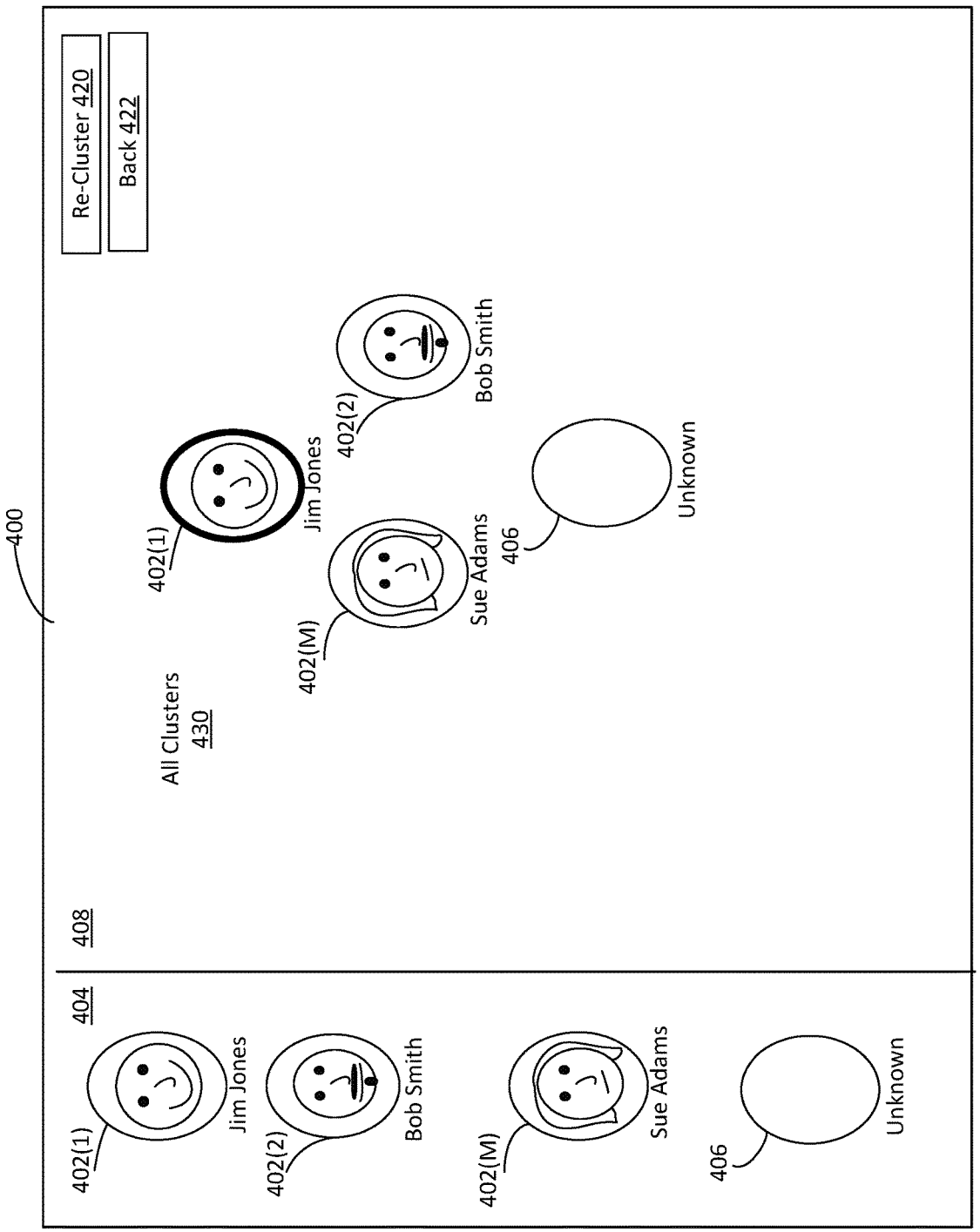
FIG. 4 is an illustrative example of an initial graphical user interface (GUI) screen display presented by a human-in-the-loop system of the system of FIG. 1.

Referring to FIG. 4, GUI 400 includes a drop region 404 and a selection region 408. In example embodiments, the drop region 404 and selection region 408 may each be independently scrollable windows presented side-by-side on a display screen. In one example, in an initial or home screen, the selection region 408 presents an "All Clusters" display 430 that includes user selectable items that each represent a respective one of the FV cluster groups 160(1) to 160(M) (which in turn each represent one of the M objects detected in the unstructured data 90). In the illustrated example, the user selectable items are presented as face images 402(1) to 402(M) that correspond to the M actors (e.g. M object classes) that are represented in the FV cluster groups 160(1) to 160(M), respectively.

In example embodiments, the actual face image used for each user selectable face image 402(i) corresponds to a feature vector FV that is included in the key cluster 250 from the FV cluster group 160(i) that corresponds to the actor. By way of example, displayed face image 402(1) displays a face image of an actor "Jim Jones". The actual face image of Jim Jones presented as the displayed face image 402(1) corresponds to one of the feature vectors FV included in the key cluster 250 of the "Jim Jones" FV cluster group 160(1). In example embodiments, the specific feature vector FV may be selected from the key cluster 250 based on any number of different selection criteria—for example it could be the Ith feature vector in the cluster, where I is a predetermined number or is randomly selected. In the case where the selected feature vector FV maps to a specific single face image from input video V, that face image will be used for the displayed face image 402(1). In the case where the selected feature vector FV maps to a plurality of faces images from input video V (for example in the case of a multi-frame face track as described above in which each data object occurrence corresponds to image data for a series of frames in a scene segment), then the face image may be selected from one of the frames.

As shown in FIG. 4, the All Clusters display 430 also includes a user selectable item 406, labelled as "unknown", which will be discussed in greater detail below. In example embodiments, items that represent the M object classes are displayed in the drop region 404 in the form of the face images 402(1) to 402(M) for the M actors.

Figure 5:
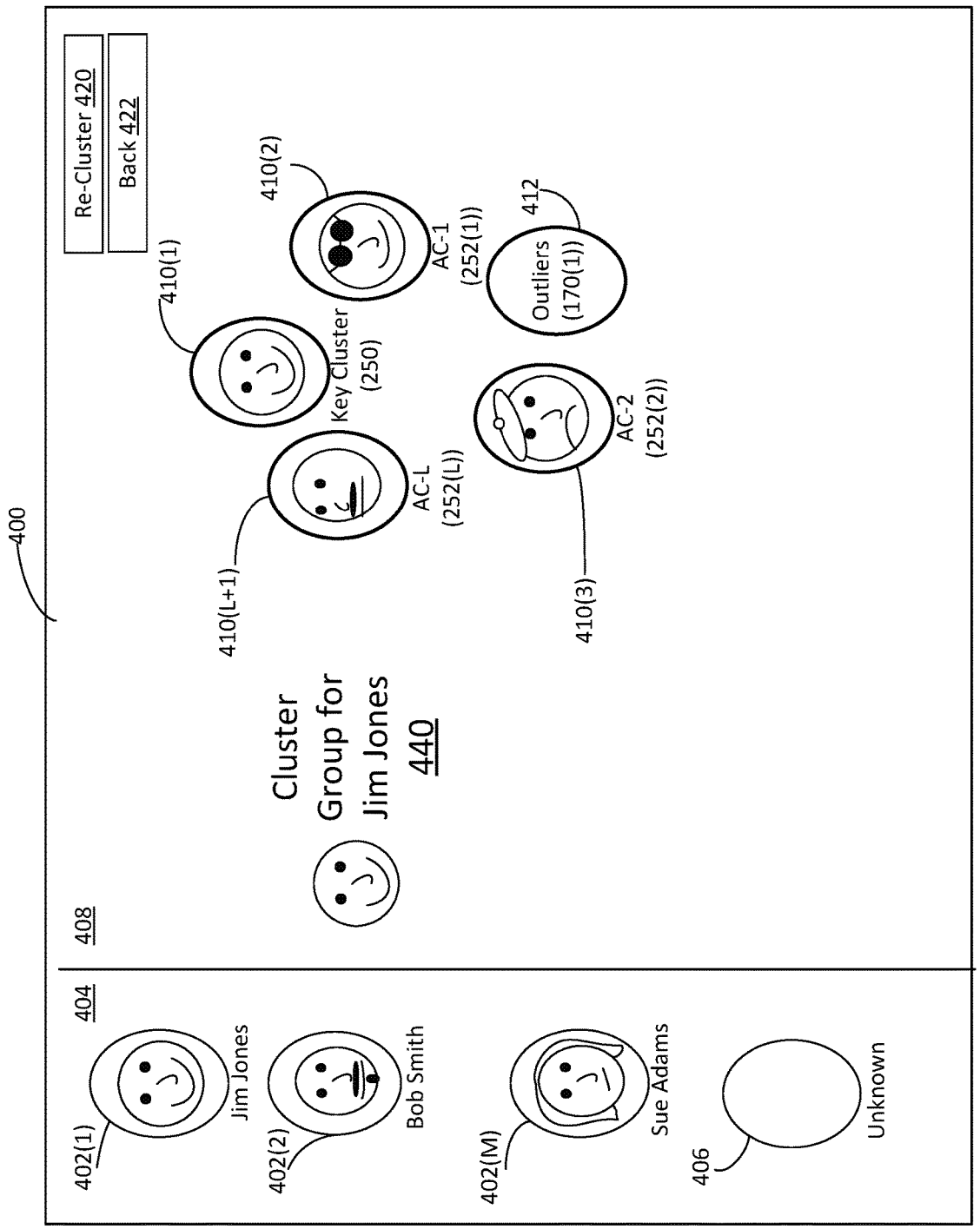
FIG. 5 is an illustrative example of a further GUI screen display showing user selectable items that each represent a respective cluster.

In example embodiments, a user can select one of the actor face images 402(1) to 402(M) displayed in the selection region 408 of GUI 400 to receive information about the FV cluster group 160(i) corresponding to the selected actor. By way of example, HITL system 140 may be configured to detect a user selection input through a navigation input device (for example a mouse, trackpad, touch screen interface, voice interface, etc.) selecting one of the actor face images, for example face image 402(1), which as indicated by an on-screen indicator has been labelled with actor identifier "Jim Jones". Upon detecting the actor selection input, HITL system 140 causes information about the FV cluster group 160(1) that corresponds to Jim Jones to be displayed in the selection region 408 of GUI 400 in the form of an actor specific "Cluster Group" display 440, as illustrated in FIG. 5. As noted above, and shown in FIG. 3, the FV cluster group 160(1) includes key cluster 250 and ancillary clusters 252(1) to 252(L).

Accordingly, in example embodiments, the Cluster Group display 440 displayed in the selection region 408 of GUI 400 includes user selectable items that each represent a respective one of key cluster 250 and ancillary clusters 252(1) to 252(L+1). In the illustrated example, these items take the form of face images 410(1) to 410 (L+1) that each represent a respective one of the clusters 250 and 252(1) to 252(L+1). In example embodiments, the user selectable face images 410(1) to 410 (L+1) may include a representative face image from the respective cluster, selected in same manner as described above in respect of face images 402(1) to 402(M). The user selectable images 410(1) to 410 (J+1) may also each be labelled with an onscreen text label identifying the cluster (e.g. text labels such as "Key Cluster", "AC-1" to "AC-L" as shown in FIG. 5). In addition to the cluster group information, in example embodiments, HITL system 140 is configured to also display a user selectable item 412 that represents the outlier FV set 170(1) corresponding to selected actor Jim Jones. In some examples a face image corresponding to one of the feature vectors FV included in the outlier FV set 170(1) may be presented as the user selectable item 412.

Figure 6:
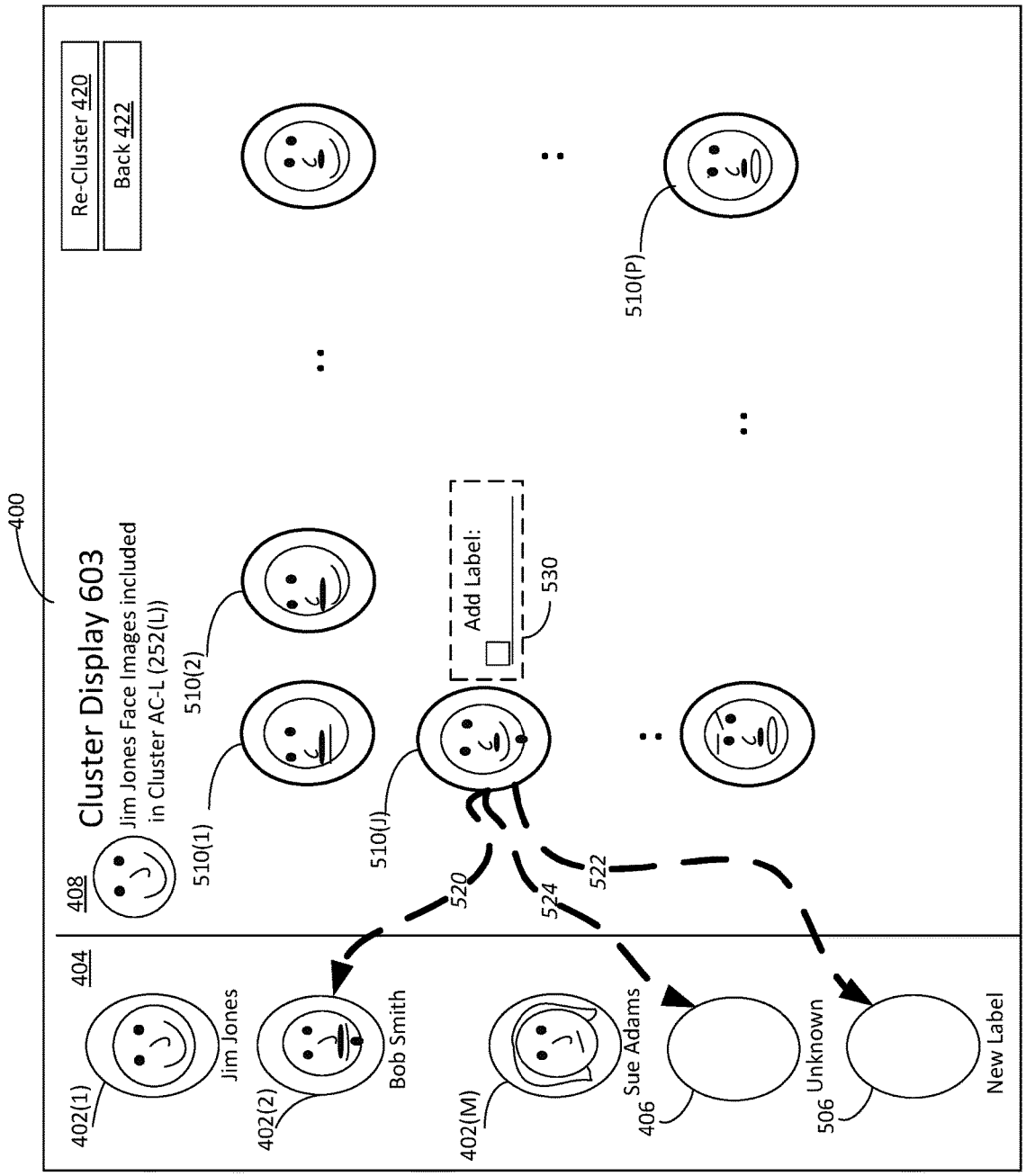
FIG. 6 is an illustrative example of a further GUI screen display showing user selectable items that each represent a feature vector of a selected cluster.

In example embodiments, user selection of one of the face images 410(1) to 402(L+1) in selection region 408 will cause HITL system 140 to display user selectable data object items representing the feature vectors FV of the cluster 250, 252(1) to 252(L) that corresponds to the selected face image. The selectable items are displayed in the selection region 408, enabling a user to determine if feature vectors FV included in the cluster have been correctly classified and manually correct incorrectly classified feature vectors. By way of an illustrative example, FIG. 6 shows a scenario where HITL system 140 has detected a user selection input through a navigation input device selecting the face image 410(L+1) that represents cluster group 252(L) corresponding to "Jim Jones". Upon detecting the selection input, as shown in FIG. 6, HITL system 140 causes a cluster display 603 in the selection region 408 that includes user selectable items that correspond to feature vectors FV from the selected cluster group 252(L). In the illustrated example, the selected cluster group 252(L) for Jim Jones includes P feature vectors FV, and the user selectable items are the face images 510(1)-510(P) that are respectively represented by those feature vectors FV. In example embodiments the face images 510(1)-510(P) may be displayed as a two dimensional array such that a user viewing the GUI 400 is able to quickly assess if any of the displayed face images 510(1)-510(P) have been incorrectly labelled as "Jim Jones". In example embodiments, the array of face images 510(1)-510(P) may be scrollable if there are too many items to display onscreen at once.

Example methods of correcting a mislabeled feature vector FV, will now be described with respect to FIG. 6. In the illustrated embodiment, a human user recognizes that the user selectable face image 510(J) displayed in selection region 408 does not actually show actor "Jim Jones", indicating that the feature vector FV that corresponds to the face image 510(J) has been incorrectly labelled by classification system 102 and incorrectly classified by clustering module 108, leading to an error in FV cluster group 160(1). HITL system 140 enables the error to be easily detected and corrected by human intervention. In particular, in example embodiments, a user can perform a drag and drop operation with the face image 510(J) to correct the error. In an illustrative scenario, the face image 510(J) actually corresponds to another one of the M actors that are shown in drop region 404, namely "Bob Smith". In such case, the user can, via a navigation input device select the face image 510(J) and drag it to the face image 402(2) of "Bob Smith" in the drop region 404 as indicated by dashed line 520. In response to the user drag and drop input action, the HITL system 140 causes the feature vector FV that corresponds to face image 510(J) to be removed from cluster 252(L) of Jim Jones' FV cluster group 160(1) and re-labelled as a Bob Smith feature vector FV, and added to Bob Smith's FV cluster group 160(2) (e.g. the feature vector FV that corresponds to face image 510(J) is reclassified as belonging to the "Bob Smith" object class). The manually relabeled feature vector will have a high classification confidence. In some examples, any relabeled feature vectors moved to cluster groups will be added to a special high confidence cluster within the cluster group. This is graphically illustrated in FIG. 7, which shows the feature vector corresponding to face image 510(J) being removed from Jim Jone's ancillary cluster 252(L) and added to a special manually populated cluster 602 within Bob Smith's FV cluster group 160(2). In some example embodiments, relabeled feature vectors moved to other cluster groups may alternatively be added to one of the existing clusters in the group, for example the key cluster 250.

Figure 8:
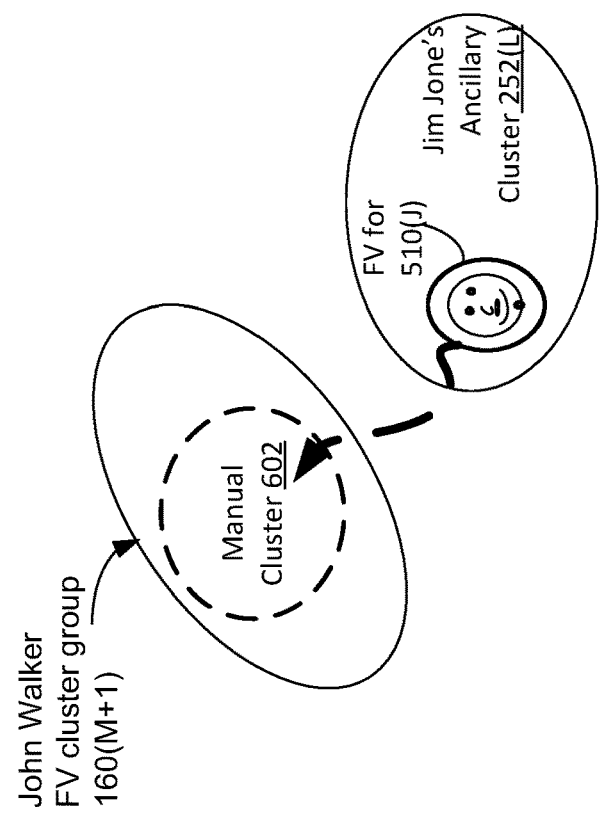
FIG. 8 graphically illustrates the movement of a feature vector from a first cluster associated with a first data object to a second cluster associated with a newly labelled data object.
Figure 7:
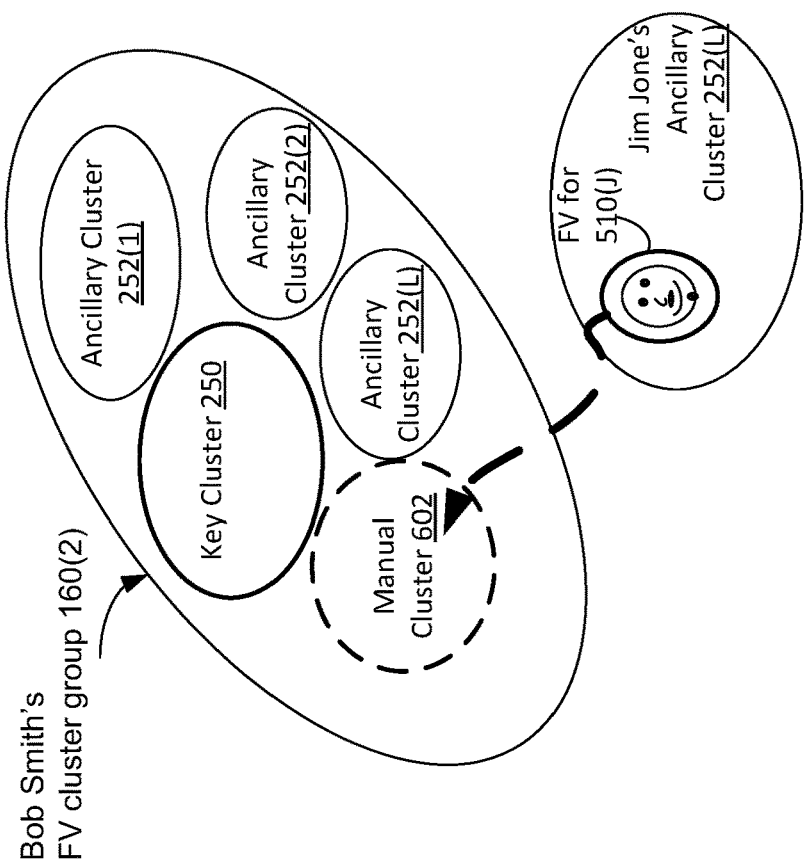
FIG. 7 graphically illustrates the movement of a feature vector from a first cluster associated with a first data object to a second cluster associated with a second data object.

Referring again to FIG. 6, in another illustrative scenario, the face image 510(J) actually corresponds to an as-yet unlabelled or unidentified actor that is not included in the M actors that are shown in the drop region 404. In such case, the user can add a new object class corresponding to the new actor. In particular, using a navigation input device the user can select the face image 510(J) and, as indicated by dashed line 522, drag it to a "New Label" item 506 that is displayed in the drop region 404. In response to the user drag and drop input action, the HITL system 140 prompts the user to add the name of the new actor (for example, "John Walker"), for example by displaying an interactive dialog box 530. HITL system 140 then causes the feature vector FV that corresponds to face image 510(J) to be removed from Jim Jones' FV cluster group 160(1), creates a new cluster group 160(M+1) for the new actor (e.g. John Walker), and then adds the feature vector FV corresponding to face image 510(J) to a manual cluster 602 of the new FV cluster group 160(M+1), as illustrated in FIG. 8. In example embodiments, a face image for the newly labelled actor will be added to the drop region 404 so that other feature vectors FV can be manually transferred, as appropriate, to the manual cluster 602 of the new cluster group 160(M+1), using an input action such as the drag and drop action discussed above. Accordingly, the HITL system 140 allows feature vectors FV to be manually reclassified from one object class to a newly created object class that was previously unknown to the system 100.

Referring again to FIG. 6, in another illustrative scenario, the human user recognizes that the user selectable face image 510(J) displayed in selection region 408 does not actually show actor "Jim Jones" but is either unable to determine what actor the face image 510(J) corresponds to, or does not want to relabel the image at the current time. In such case, the user can use a navigation input device to select the face image 510(J) and, as indicated by dashed line 524, drag it to "Unkown" item 406 that is displayed in the drop region 404. In response to the user drag and drop input action, the HITL system 140 causes the feature vector FV that corresponds to face image 510(J) to be removed from Jim Jones' FV cluster group 160(1), and may discard it or alternatively add it to the Unknown FVS 155 or a further miscellaneous feature vector set.

In some example embodiments, once a particular set of face images included in a cluster have been manually reviewed, the cluster (even if a non-key cluster) may be labelled by HITL system 140 to be a high confidence cluster that can be added to training dataset 92. For example, in the scenario described above, the Jim Jones cluster 252(L) may be labeled as a high confidence cluster after it has been edited, and added to training dataset 92.

Figure 9:
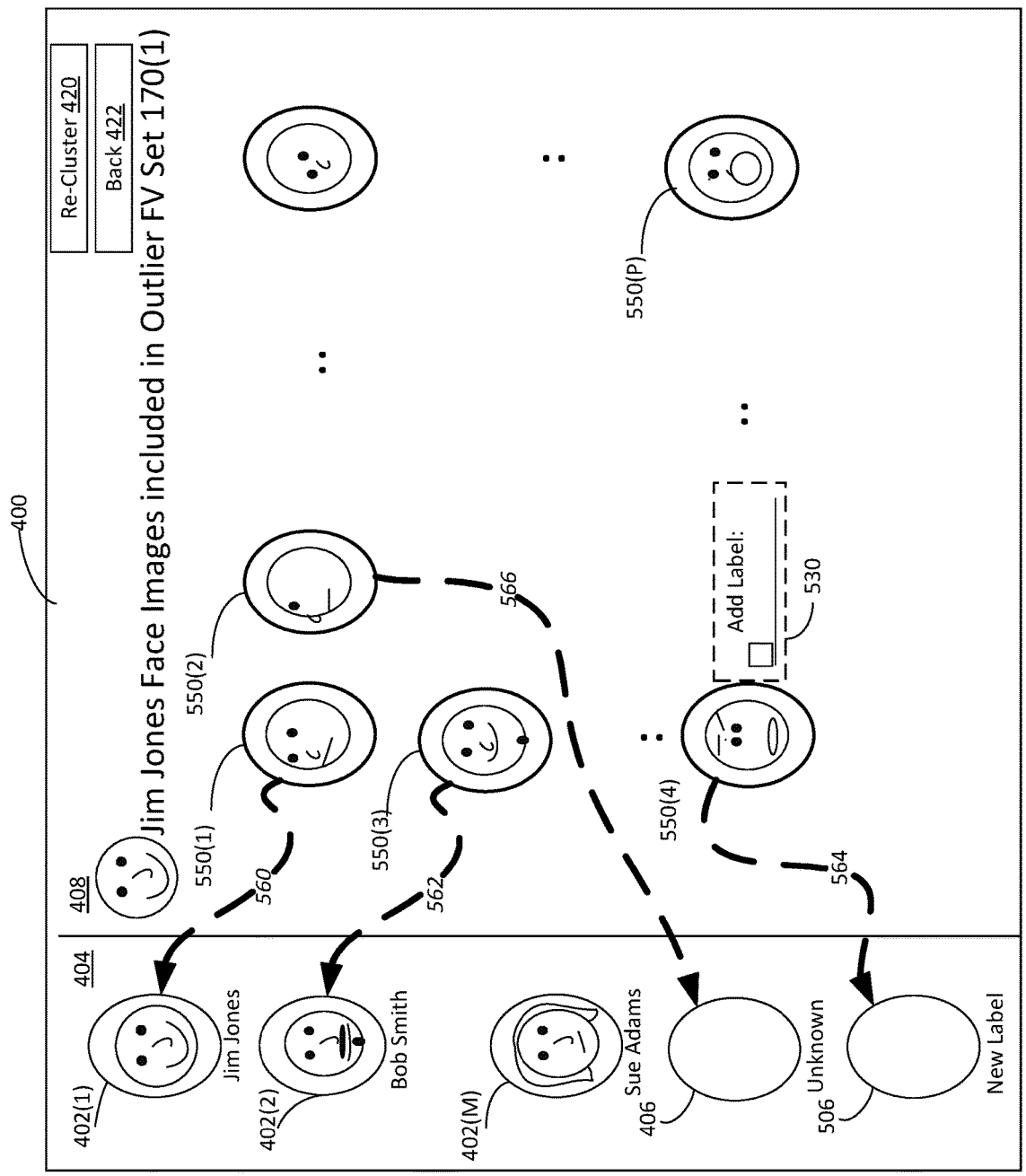
FIG. 9 is an illustrative example of a further GUI screen display showing user selectable items that each represent a feature vector of an outlier feature vector set.

Turning again to FIG. 5, as noted above, a user selectable item 412 that represents the low confidence outlier FV set 170(1) corresponding to actor Jim Jones may also be displayed in the selection region 408 along with the user selectable face images 410(1) to 410(4) that link to respective Jim Jones's clusters. Upon detecting an input selecting user selectable item 412, HITL system 140 causes user selectable items that correspond to feature vectors FV from the outlier FV set 170(1) to be displayed in the selection region 408, as shown in FIG. 9. In the illustrated example, the outlier FV set 170(1) for Jim Jones includes P feature vectors FV, and the user selectable items are the face images 550(1)-550(P) that are respectively represented by those feature vectors FV. In example embodiments the face images 550(1)-550(P) may be displayed as a two dimensional array such that a user viewing the GUI 400 is able to quickly assess and take action in respect of the displayed face images 550(1)-550(P).

As shown in FIG. 9, HITL system 140 allows the user to take a number of different manual classification actions, including actions to confirm that the feature vector FV represented by a displayed item has been correctly labelled (e.g. confirm illustrated face image is Jim Jones). By way of illustration, in the example of FIG. 9, the user confirms that face image 550(1) is in fact Jim Jones by preforming a drag and drop action (indicated by dashed line 560) to drag the face image 550(1) from the selection region 408 and drop it on the Jim Jones face image 402(1) in the drop region 404. In other example embodiment, a user may confirm the labelling by checking a confirm button or other input by or near the displayed face image 550(1). In another example embodiment, a user may confirm the labelling by not taking any direct action in respect of the displayed face image 550(1) and a subsequent user action of exiting the displayed screen (for example by selecting a "Back" button 422) without any direct interaction with displayed face image 550(1) is interpreted as a labelling confirmation input. In example embodiments, upon detecting a user input confirming the labelling of one or more of the outlier feature vectors FV, HITL system 100 is configured to move the outlier feature vector from the outlier FV set 170(1) to the manual cluster 602 corresponding to the subject actor (Jim Jones in the present example).

As shown in FIG. 9, in the event that the feature vector FV represented by a displayed item (e.g. face image) has been incorrectly labelled, the user also has the relabeling options described above in respect of FIGS. 6 through 8, including: (i) use a predetermined action, such as drag and drop as illustrated by dashed line 562, to cause HITL system 100 to relabel a feature vector FV with the identify of a listed actor and move the outlier feature vector FV from outlier FV set 170(1) to the manual cluster 602 for that actor; (ii) use a predetermined action, such as drag and drop as illustrated by dashed line 564, to cause HITL system 100 to relabel a feature vector FV with the identify of a new actor with a label provided by the user through a dialog box 530 and move the outlier feature vector FV from the outlier FV set 170(1) to the manual cluster 602 for that new actor; and (iii) use a predetermined action, such as drag and drop as illustrated by dashed line 566, to cause HITL system 100 to relabel a feature vector FV as unknown and move the outlier feature vector FV from outlier FV set 170(1) and to Unknown FVS 155.

Turning again to FIGS. 5 and 6, in some scenarios it may be possible that some clusters 250, 252(1) to 252(J), include such a large number of feature vectors that displaying all of the corresponding face images in to a human user in a cluster display 603 interface such as shown in FIG. 6 would be overwhelming. In such examples, HITL system 140 may be configured to determine if the number of feature vectors FV included in a cluster exceeds a viewing threshold for cluster display 603, and if so, then only a selected set of the feature vectors FV are selected for representation in the cluster display 603. The feature vectors FV of a cluster can be selected using a number of different options, including randomly or according to a predetermined selection algorithm. In at least some example embodiments, HITL system 140 may call on the clustering unit 104 corresponding to the subject actor to generate sub-clusters for the selected cluster, and then use one of the generated sub-clusters for display.

Turning again to FIG. 4, as noted above, an initial screen of GUI 400 may also include a user selectable "Unknown" item 406 in the selection region 408 along with the user selectable face images 402(1) to 402(M). In an example embodiments, user selection of the "Unknown" item results in a display of user selectable face images corresponding to the "Unknown" feature vectors FV included in the Unknown FVS 155. By way of example, the user selectable face images corresponding to the "Unknown" feature vectors FV could be represented in a manner similar to that shown in FIG. 9, and processed in a similar manner. For example, a user could perform the following actions to manually classify the "Unknown" feature vectors FV: (i) use an action, such as drag and drop, to cause HITL system 100 to relabel an "Unknown" feature vector FV with the identify of a listed actor and move the feature vector FV from the Unknown FVS 155 to the manual cluster 602 for that actor; (ii) use an action, such as drag and drop, to cause HITL system 100 to relabel the "Unknown" feature vector FV with the identify of a new actor with a label provided by the user through a dialog box 530, create an new object class corresponding to the actor, and move the feature vector FV from the Unknown FVS 155 to the manual cluster 602 for that new actor; and (iii) take no direct action in respect of the "Unknown" feature vector FV and leave it in the unknown FVS 155.

Accordingly, in example embodiments, HITL system 140 works in conjunction with training dataset assembly module 120 and outlier/unknown data assembly module 130 to enable human intervention to modify the content of the FV clusters groups 160(1) TO 160(M), the outlier FV sets 170(1) to 170(M), and the Unknown FVS 155. In this regard, HITL system 140 may in various embodiments enable human intervention to: reclassify feature vectors FV between clusters both within a cluster group and between the cluster groups for different object classes; confirm the classification of, or reclassify as required, outlier feature vectors FV; add new object classes (and corresponding labels) for feature vectors FV that are incorrectly labeled or unlabeled, as required. As noted above, in example embodiments, clusters that have been created through manual intervention (e.g. manual clusters 602) may be treated as high confidence clusters and added to training dataset 92. In some examples, ancillary clusters 252(2) to 252(L) that have been subjected to manual review may also be treated as higher confidence data and added to training dataset 92. The training dataset 92 can then be used for further training of the system 100 in the manner discussed above.

In some scenarios, the quality of training dataset 92 may incrementally improve as the user manually updates the cluster data through HITL system 140. In at least some examples HITL system 140 is configured to allow a human user to take advantage of the incremental improvements by allowing the user to manually cause the system 100 to retrain itself and regenerate the FV cluster groups 160, Outlier FV sets 170 and Unknown FVS 155. A user may want to do this for example when the user is of the opinion that the training dataset 92 is sufficiently improved that the system 100 would benefit from retraining and provide a better quality dataset for the user to continue to manually work with. In this regard, in example embodiments, the HITL system 100 displays a user selectable item, for example a "Re-Cluster" button 420, in GUI 400. When HITL system 100 detects user input selecting the "Re-Cluster" button 420, HITL system 100 uses the current version of training dataset 92 to automatically retrain one or both of the classification system 102 and clustering system 103 and reprocess unstructured data 90 to regenerate FV cluster groups 160, Outlier FV sets 170 and Unknown FVS 155.

Accordingly, in an example use case where unstructured data 90 includes video V and an objective of system 100 is to create meta-data for the video V that details all actor appearances and the timing of such appearances throughout the video, a human user can work interactively and iteratively with system 100 to train system 100 to provide such information. The training dataset 92 includes FV's or data objects with automatically generated labels supplemented with human corrections. The FV's or data objects with automatically generated labels included in the training dataset 92 together with information from DO/FV Map table 105 can allow the creation of meta-data that lists all actor appearances in the video V and the timing of such appearances.

In at least some examples, one or more of the functions performed by feature extraction modules 102A, classifier module 102C and clustering module 108 could be combined into a single end-to-end deep learning network, rather than being performed by separate modules and networks. In some examples, the order of clustering system 103 and classifier module 102C can be reversed, for example, the feature vectors FV for all target objects can be subjected to a common clustering operation by a single clustering unit 104, which each cluster then being subjected to classifier module 102C to break the clusters into target object specific cluster groups.

Figure 10:
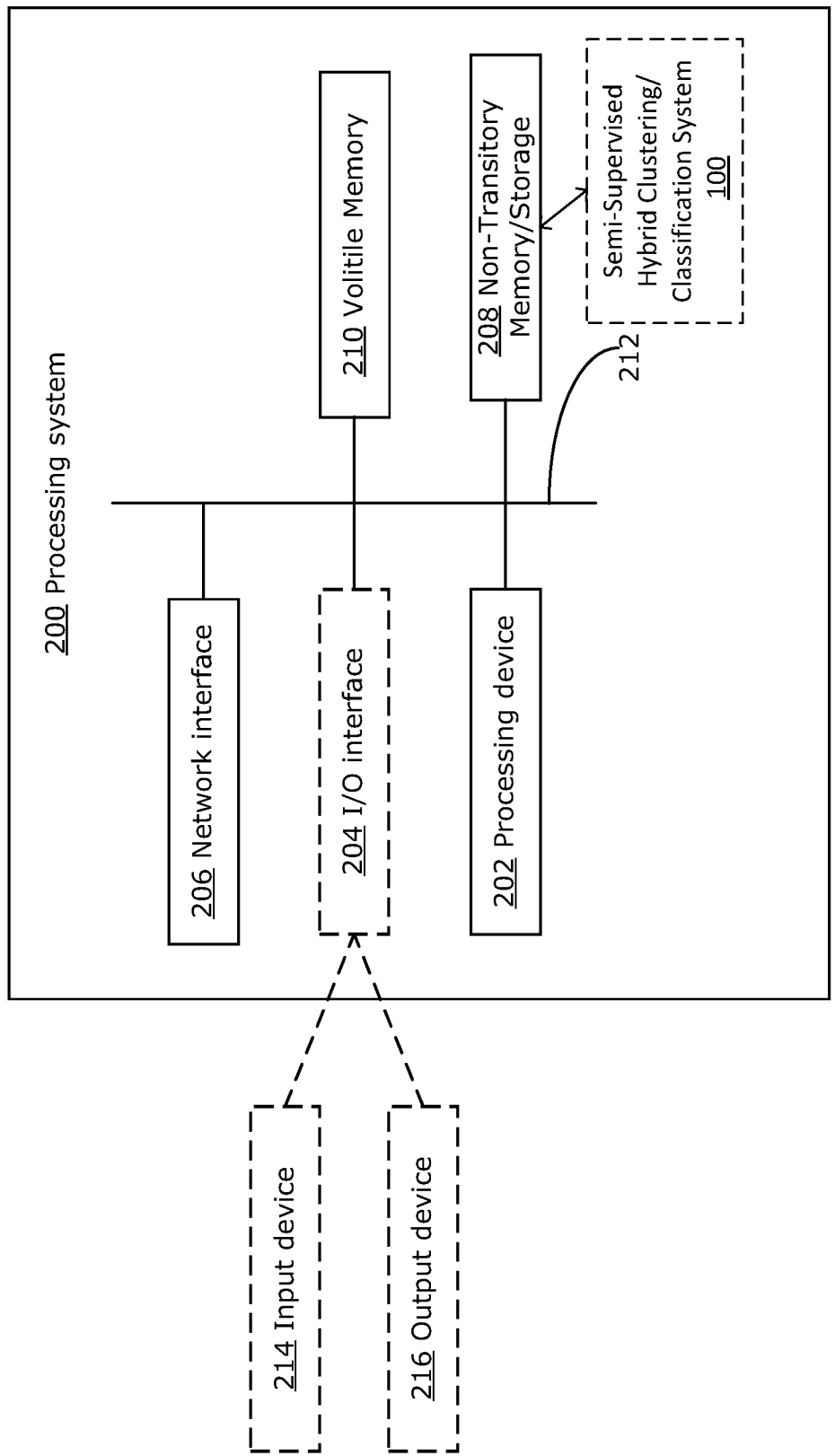
FIG. 10 is a block diagram illustrating a processing system that can be

FIG. 10 is a block diagram of an example processing system 200, which may be used to implement embodiments disclosed herein. The example processing system 200 described below, or variations thereof, may be used to implement one or more of the systems and modules of the system 100. Other processing systems may be suitable for implementing embodiments described in the present disclosure, and may include components different from those discussed below. Although FIG. 10 shows a single instance of each component, there may be multiple instances of each component in the processing system 200. In some examples, a plurality of processing systems 200 may be used to implement embodiments disclosed herein.

The processing system 200 may include one or more processing devices 202, such as a processor, a microprocessor, a graphics processing unit (GPU) an application-specific integrated circuit (ASIC), a field-programmable gate array (FPGA), a dedicated logic circuitry, or combinations thereof. The processing system 200 may include one or more input/output (I/O) interfaces 204, to enable interfacing with one or more optional input devices 214 and/or output devices 216. The processing system 200 may include one or more network interfaces 206 for wired or wireless communication with a network (e.g., an intranet, the Internet, a P2P network, a WAN and/or a LAN) or other node. The network interface(s) 206 may include wired links (e.g., Ethernet cable) and/or wireless links (e.g., one or more antennas) for intra-network and/or inter-network communications.

The processing system 200 may also include one or more non-transitory storage units or memory(ies) 208, which may include a mass storage unit such as a solid state drive, a hard disk drive, a magnetic disk drive and/or an optical disk drive, and one or more non-volatile memories such as a flash memory, and/or a read-only memory (ROM). The processing system 200 may include one or more volatile memory (ies) 210 (e.g., a random access memory (RAM). The non-transitory memory(ies) 208 may store instructions for execution by the processing device(s) 202, such as to carry out example methods described in the present disclosure as well as other software instructions, such as for implementing an operating system and other applications/functions. For example, the non-transitory memory(ies) 208 may include computer instructions that configure the processing system 200 to implement system 100. In some examples, instructions stored in non-transitory memory(ies) 208 may be temporarily loaded into volatile memory(ies) 210 for execution by processing device 202.

In some examples, one or more data sets and/or modules may be provided by an external memory (e.g., an external drive in wired or wireless communication with the processing system 200) or may be provided by a transitory or non-transitory computer-readable medium. Examples of non-transitory computer readable media include a RAM, a ROM, an erasable programmable ROM (EPROM), an electrically erasable programmable ROM (EEPROM), a flash memory, a CD-ROM, or other portable memory storage.

There may be a bus 212 providing communication among components of the processing system 200, including the processing device(s) 202, optional I/O interface(s) 204, network interface(s) 206, non-transitory memory(ies) 208 and/or volatile memory(ies) 210. The bus 212 may be any suitable bus architecture including, for example, a memory bus, a peripheral bus or a video bus.

In FIG. 10, the optional input device(s) 214 (e.g., a keyboard, a mouse, a microphone, a touchscreen integrated into or overlayed on a display device, and/or a keypad) and optional output device(s) 216 (e.g., a display device, a speaker and/or a printer) are shown as external to the processing system 200. In other examples, one or more of the input device(s) 214 and/or the output device(s) 216 may an internal component of the processing system 200. In the case of user equipment 102, input device(s) 214 will include a display device having a display screen and a user interface (UI) navigation input device (for example a touchscreen input, a mouse, a trackpad, voice interface, or other interface device) for allowing a user to interact with items displayed by the display device.

In example embodiments, data used or generated during operation of the system 100 or to support system 100 may be stored in one or both of volatile memory 210 and non-transitory memory 208. By way of example, the data included in feature vector sets FVS 150(1) to 150(M), modified FVS(s) 112, cluster module output(s) 223, outlier FV(s) 255, outlier FV sets 170(1) to 170(M), Unknown FVS 155, DO/FV Map table 103, and training dataset 92, and outlier/unknown dataset 132 may be periodically stored and updated in one or both of volatile memory 210 and non-transitory memory 208.

Although the present disclosure describes methods and processes with steps in a certain order, one or more steps of the methods and processes may be omitted or altered as appropriate. One or more steps may take place in an order other than that in which they are described, as appropriate.

Although the present disclosure is described, at least in part, in terms of methods, a person of ordinary skill in the art will understand that the present disclosure is also directed to the various components for performing at least some of the aspects and features of the described methods, be it by way of hardware components, software or any combination of the two. Accordingly, the technical solution of the present disclosure may be embodied in the form of a computer program product or software product. A suitable software product may be stored in a pre-recorded storage device or other similar non-volatile or non-transitory computer readable medium, including DVDs, CD-ROMs, USB flash disk, a removable hard disk, or other storage media, for example. In some examples, the software product is downloadable from a server and can be installed on a processing system, such as processing system 200. The software product includes instructions tangibly stored thereon that enable a processing device (e.g., a personal computer, a server, or a network device) to execute examples of the methods disclosed herein.

The present disclosure may be embodied in other specific forms without departing from the subject matter of the claims. The described example embodiments are to be considered in all respects as being only illustrative and not restrictive. Selected features from one or more of the above-described embodiments may be combined to create alternative embodiments not explicitly described, features suitable for such combinations being understood within the scope of this disclosure.

All values and sub-ranges within disclosed ranges are also disclosed. Also, although the systems, devices and processes disclosed and shown herein may comprise a specific number of elements/components, the systems, devices and assemblies could be modified to include additional or fewer of such elements/components. For example, although any of the elements/components disclosed may be referenced as being singular, the embodiments disclosed herein could be modified to include a plurality of such elements/components. The subject matter described herein intends to cover and embrace all suitable changes in technology.

The invention claimed is:

1. A computer implemented method for classifying data objects occurring in unstructured data, comprising:
   extracting feature vectors from the unstructured data, each feature vector representing an occurrence of a data object in the unstructured data;
   classifying, using a trained learning based classifier, the feature vectors into feature vector sets that each correspond to a respective object class of a plurality of object classes, wherein each feature vector is classified by the trained learning based classifier into one of the feature vector sets corresponding to one of the plurality of object classes;
   for each feature vector set:
      performing multiple iterations of a clustering operation, each iteration including clustering feature vectors from the feature vector set into clusters of similar feature vectors and identifying outlier feature vectors, wherein for at least one iteration after a first iteration of the clustering operation, outlier feature vectors identified in a previous iteration are excluded from the clustering operation; and
      outputting a key cluster for the feature vector set after a final iteration of the multiple iterations, the key cluster including a greater number of similar feature vectors than any of the other clusters after the final iteration;
   assembling a dataset that includes at least the feature vectors from the key cluster output for each of the feature vector sets; and
   retraining the learning based classifier using the feature vectors included in the assembled dataset.

2. The method of claim 1 wherein the object classes include known object classes and an unknown object class corresponding to feature vectors that are not classified into feature vectors sets corresponding to the known object classes, the method comprising, following the retraining of the learning based classifier, providing the feature vectors included in the unknown object class to the learning based classifier for reclassification.

3. The method of claim 1 wherein: the unstructured data includes a video including successive image frames; the data objects each correspond to a respective face image; and the object classes each correspond to a respective individual person.

4. The method of claim 3 wherein extracting feature vectors from the unstructured data comprises identifying a face image over a series of successive image frames as an occurrence of a data object corresponding to the face image, and extracting the feature vector representing the data object based on data included in a plurality of the successive image frames.

5. The method of claim 1 comprising:
displaying items on a display screen representing one or more of the features vectors; and
in response to one or more predetermined input actions detected in respect of the displayed items, updating the assembled dataset.

6. The method of claim 1, wherein in addition to outputting the key cluster for each feature vector set, the method further includes:
outputting the other clusters after the final iteration of the clustering operation for the feature vector set, and
outputting the outlier feature vectors from all iterations of the clustering operation for the feature vector set,
storing in memory the output key clusters, output other clusters and output outlier feature vectors for the feature vector, and
displaying items that each represent a respective feature vectors of a selected cluster;
in response a user action selecting one of the items, removing the feature vector represented by the selected item from the selected cluster.

7. The method of claim 6, the method comprising:
displaying object class items representing respective object classes;
in response to a user action indicating one of the object class items; reclassifying the feature vector represented by the selected item to the feature vector set corresponding to the object class represented by the indicated object class item; and
including the reclassified feature vector in the assembled dataset.

8. The method of claim 1 further comprising:
receiving further unstructured data;
extracting feature vectors from the further unstructured data, each feature vector representing an occurrence of a data object in the further unstructured data;
classifying, using the retrained learning based classifier, the feature vectors into feature vector sets that each correspond to a respective object class of the plurality of object classes, wherein each feature vector is classified by the retrained learning based classifier into one of the feature vector sets corresponding to one of the plurality of object classes;
for each feature vector set:
performing multiple iterations of a clustering operation, each iteration including clustering feature vectors from the feature vector set into clusters of similar feature vectors and identifying outlier feature vectors, wherein for at least one iteration after a first iteration of the clustering operation, outlier feature vectors identified in a previous iteration are excluded from the clustering operation; and
outputting a key cluster for the feature vector set after a final iteration of the multiple iterations, the key cluster including a greater number of similar feature vectors than any of the other clusters of after the final iteration;
assembling a further dataset that includes at least the feature vectors from the key cluster output for each of the feature vector sets; and
retraining the learning based classifier using the feature vectors included in the further assembled dataset.

9. The method of claim 1 wherein assembling a dataset comprises, labeling each feature vector from the key cluster output for each of the feature vector sets.

10. The method of claim 9, wherein retraining comprises retraining the learning based classifier using labeled feature vectors of training dataset and the labeled feature vectors of the assembled dataset, wherein each label feature vector in the training dataset corresponds to a data object.

11. A system for classifying data objects occurring in unstructured data, the system including:
a classification system configured to:
extract feature vectors from the unstructured data, each feature vector representing an occurrence of a data object in the unstructured data; and
classify, using a trained learning based classifier, the feature vectors into feature vector sets that each correspond to a respective object class of a plurality of object classes, wherein the trained learning based classifier is configured to classify each feature vector into one of the feature vector sets corresponding to one of the plurality of object classes;
a clustering system configured to, for each feature vector set:
perform multiple iterations of a clustering operation on the feature vector set, each iteration including clustering feature vectors from the feature vector set into clusters of similar feature vectors and identifying outlier feature vectors, wherein for at least one iteration after a first iteration of the clustering operation, outlier feature vectors identified in a previous iteration are excluded from the clustering operation; and
output a key cluster for the feature vector set after a final iteration of the multiple iterations, the key cluster including a greater number of similar feature vectors than any of the other clusters after the final iteration; and
a dataset assembly module configured to assemble a dataset that includes at least the feature vectors from the key cluster output for each of the feature vector sets,
the classification system being further configured to retrain the learning based classifier using the feature vectors included in the assembled dataset.

12. The system of claim 11 wherein the system is a facial recognition system and the unstructured data includes a video including successive image frames; the data objects each correspond to a respective face image; and the object classes each correspond to a respective individual person.

13. The system of claim 12 wherein the classification system includes a feature extraction module configured to extract the feature vectors from the unstructured data by identifying a face image over a series of successive image frames as an occurrence of a data object corresponding to the face image, and extracting the feature vector representing the data object based on data included in a plurality of the successive image frames.

14. The system of claim 11 comprising a human interface system configured to: display items on a display screen representing one or more of the features vectors; and in response to one or more predetermined input actions detected in respect of the displayed items, update the assembled dataset.

15. The system of claim 11, wherein:
the clustering system is configured to, for each feature vector set, output the other clusters from the final iteration of the clustering operation for the feature vector set in addition to the key cluster, and output the outlier feature vectors from all iterations of the clustering operation for the feature vector set, the system stores in a memory the output key clusters, output other clusters and output outlier feature vectors for the feature vector sets, and the system comprises a human interface system configured to:

display items that each represent a respective feature vectors of a selected cluster;

in response a user action selecting one of the items, remove the feature vector represented by the selected item from the selected cluster.

16. The system of claim 15 wherein the human interface system is configured to:

display object class items representing respective object classes;

in response to a user action indicating one of the object class items; reclassify the feature vector represented by the selected item to the feature vector set corresponding to the object class represented by the indicated object class item; and include the reclassified feature vector in the assembled dataset.

17. A computer implemented method comprising:

performing multiple iterations of a clustering operation to cluster feature vectors that each represent a respective data object in unstructured data, each iteration of the clustering operation including clustering groups of similar feature vectors into respective clusters and identifying feature vectors not included in one of the respective clusters as outlier feature vectors, wherein during one or more of the multiple iterations after a first iteration, outlier feature vectors from a previous iteration are excluded from the clustering operation, and wherein for each iteration of the clustering operation after the first iteration, the respective clusters: (i) include the groups of feature vectors included in the clusters generated in the previous iteration of the clustering operation; and (ii) exclude any feature vectors identified as outlier feature vectors in the previous iteration.

18. The computer implemented method of claim 17 wherein, for each iteration of the clustering operation, the clusters of similar feature vectors are generated using a similarity graph clustering function, the clusters including a key cluster that includes a threshold ratio of the feature vectors that are being classified during the iteration.

19. The computer implemented method of claim 18 wherein the similarity graph clustering function is configured to cluster feature vectors based on a set similarity threshold, and for each iteration of the clustering operation, the similarity graph clustering function is repeated one or more times using a different set similarity threshold each time if the key cluster does not include the threshold ratio of the feature vectors.

20. The computer implemented method of claim 18 wherein the similarity graph clustering function is implemented using a Chinese Whispers algorithm wherein the feature vectors being classified are represented as nodes and similarity between the feature vectors is represented by weighted edges connecting the nodes.

* * * * *